US012666029B2

(12) United States Patent
Cui et al.

(10) Patent No.: US 12,666,029 B2
(45) Date of Patent: Jun. 23, 2026

(54) ADAPTIVE CLIPPING WITH SIGNALED LOWER AND UPPER BOUNDS IN VIDEO CODING

(71) Applicant: QUALCOMM Incorporated, San Diego, CA (US)

(72) Inventors: Kai Cui, Munich (DE); Zhi Zhang, Munich (DE); Han Huang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 18/883,723

(22) Filed: Sep. 12, 2024

(65) Prior Publication Data

US 2025/0119547 A1     Apr. 10, 2025

Related U.S. Application Data

(60) Provisional application No. 63/604,535, filed on Nov. 30, 2023, provisional application No. 63/588,246, filed on Oct. 5, 2023.

(51) Int. Cl.
H04N 19/132          (2014.01)
H04N 19/117          (2014.01)
(Continued)

(52) U.S. Cl.
CPC ......... H04N 19/132 (2014.11); H04N 19/117 (2014.11); H04N 19/176 (2014.11); H04N 19/82 (2014.11)

(58) Field of Classification Search
CPC .. H04N 19/117; H04N 19/132; H04N 19/176; H04N 19/182; H04N 19/186; H04N 19/70; H04N 19/82
See application file for complete search history.

(56) References Cited

U.S. PATENT DOCUMENTS

2019/0068981 A1* 2/2019 Chong ................ H04N 19/184
2019/0200044 A1* 6/2019 Galpin ................ H04N 19/463
(Continued)

FOREIGN PATENT DOCUMENTS

WO          2016146158 A1     9/2016

OTHER PUBLICATIONS

Coban M., et al., "Algorithm Description of Enhanced Compression Model 10 (ECM 10)," JVET-AE2025, JVET-AE2025-v1, Joint Video Experts Team (JVET) of ITU-T SG 16 WP 3 and ISO/IEC JTC 1/SC 29, 31st Meeting, Geneva, CH, Jul. 11-19, 2023, pp. 1-83, Oct. 29, 2023, XP030313627, the whole document.

(Continued)

*Primary Examiner* — Md N Haque
(74) *Attorney, Agent, or Firm* — Shumaker & Sieffert, P.A.

(57)          ABSTRACT

A video decoder is configured to determine a minimum sample value for one or more blocks of video data, the minimum sample value being greater than 0; determine a maximum sample value for the one or more blocks of video data, the maximum sample value being less than $2^{bd}-1$ and bd being a bit depth of samples in the one or more blocks; in response to determining that a process applied to a block of the one or more blocks of video data results in a sample value that is outside a range of the minimum sample value to the maximum sample value, clip the sample value to one of the minimum sample value or the maximum sample value to generate a clipped sample value; determine a decoded version of the block based on the clipped sample value.

25 Claims, 7 Drawing Sheets

(51) Int. Cl.
  *H04N 19/176* (2014.01)
  *H04N 19/82* (2014.01)

(56) References Cited

U.S. PATENT DOCUMENTS

| | | | |
|---|---|---|---|
| 2019/0261008 A1* | 8/2019 | Fu | H04N 19/70 |
| 2020/0145667 A1* | 5/2020 | Filippov | H04N 19/593 |
| 2020/0213617 A1* | 7/2020 | Choi | H04N 19/119 |
| 2021/0160507 A1* | 5/2021 | Kim | H04N 19/96 |
| 2022/0124343 A1* | 4/2022 | Filippov | H04N 19/176 |

OTHER PUBLICATIONS

Coban M., et al., "Algorithm Description of Enhanced Compression Model 11 (ECM 11)," JVET-AF2025, Joint Video Experts Team (JVET) of ITU-T SG 16 WP 3 and ISO/IEC JTC 1/SC 29 32nd Meeting, Hannover, DE, Oct. 13-20, 2023, pp. 1-85, JVET-AF2025-V1.

Coban M., et al., "Algorithm description of Enhanced Compression Model 2 (ECM 2)," JVET-W2025, Joint Video Experts Team (JVET) of ITU-T SG 16 WP 3 and ISO/IEC JTC 1/SC 29, 23rd Meeting, by teleconference, Jul. 7-16, 2021, pp. 1-22.

Cui K., et al., "EE2-4.1: Adaptive clipping with signalled lower and upper bounds," JVET-AG0145-v1, Joint Video Experts Team (JVET) of ITU-T SG 16 WP 3 and ISO/IEC JTC 1/SC 29, 33rd Meeting, by teleconference, Jan. 17-26, 2024, pp. 1-3.

Cui K., et al., "Non-EE2: Adaptive clipping with signaled lower and upper bounds," JVET-AF0169-v2, Joint Video Experts Team (JVET) of ITU-T SG 16 WP 3 and ISO/IEC JTC 1/SC 29, 32nd Meeting, Hannover, DE, Oct. 13-20, 2023, pp. 1-2.

International Search Report and Written Opinion—PCT/US2024/046624—ISA/EPO—Dec. 9, 2024 12 Pages.

ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.

Karczewicz M., et al., "Common Test Conditions and Evaluation Procedures for Enhanced Compression Tool Testing," JVET-AE2017-v1, Joint Video Experts Team (JVET) of ITU-T SG 16 WP 3 and ISO/IEC JTC 1/SC 29, 31st Meeting, Geneva, CH, Jul. 11-19, 2023, pp. 1-12.

Karczewicz M., et al., "Common Test Conditions and Evaluation Procedures for Enhanced Compression Tool Testing," JVET-AF2017-v1, Joint Video Experts Team (JVET) of ITU-T SG 16 WP 3 and ISO/IEC JTC 1/SC 29 32nd Meeting, Hannover, DE, Oct. 13-20, 2023, pp. 1-12.

* cited by examiner

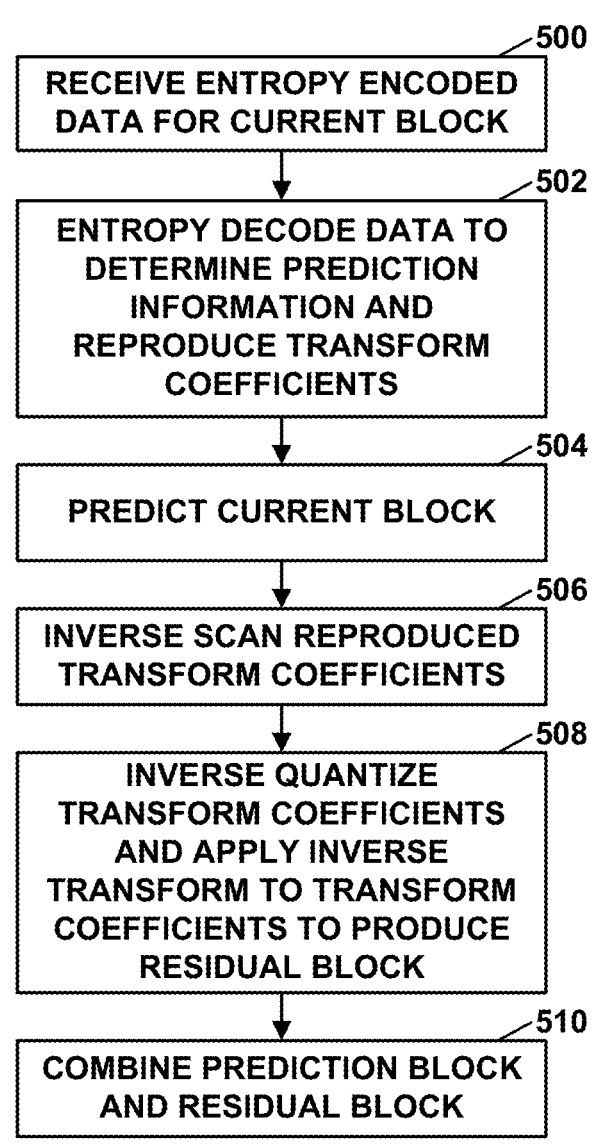

RECEIVE ENTROPY ENCODED DATA FOR CURRENT BLOCK ⌐500

ENTROPY DECODE DATA TO DETERMINE PREDICTION INFORMATION AND REPRODUCE TRANSFORM COEFFICIENTS ⌐502

PREDICT CURRENT BLOCK ⌐504

INVERSE SCAN REPRODUCED TRANSFORM COEFFICIENTS ⌐506

INVERSE QUANTIZE TRANSFORM COEFFICIENTS AND APPLY INVERSE TRANSFORM TO TRANSFORM COEFFICIENTS TO PRODUCE RESIDUAL BLOCK ⌐508

COMBINE PREDICTION BLOCK AND RESIDUAL BLOCK ⌐510

FIG. 6

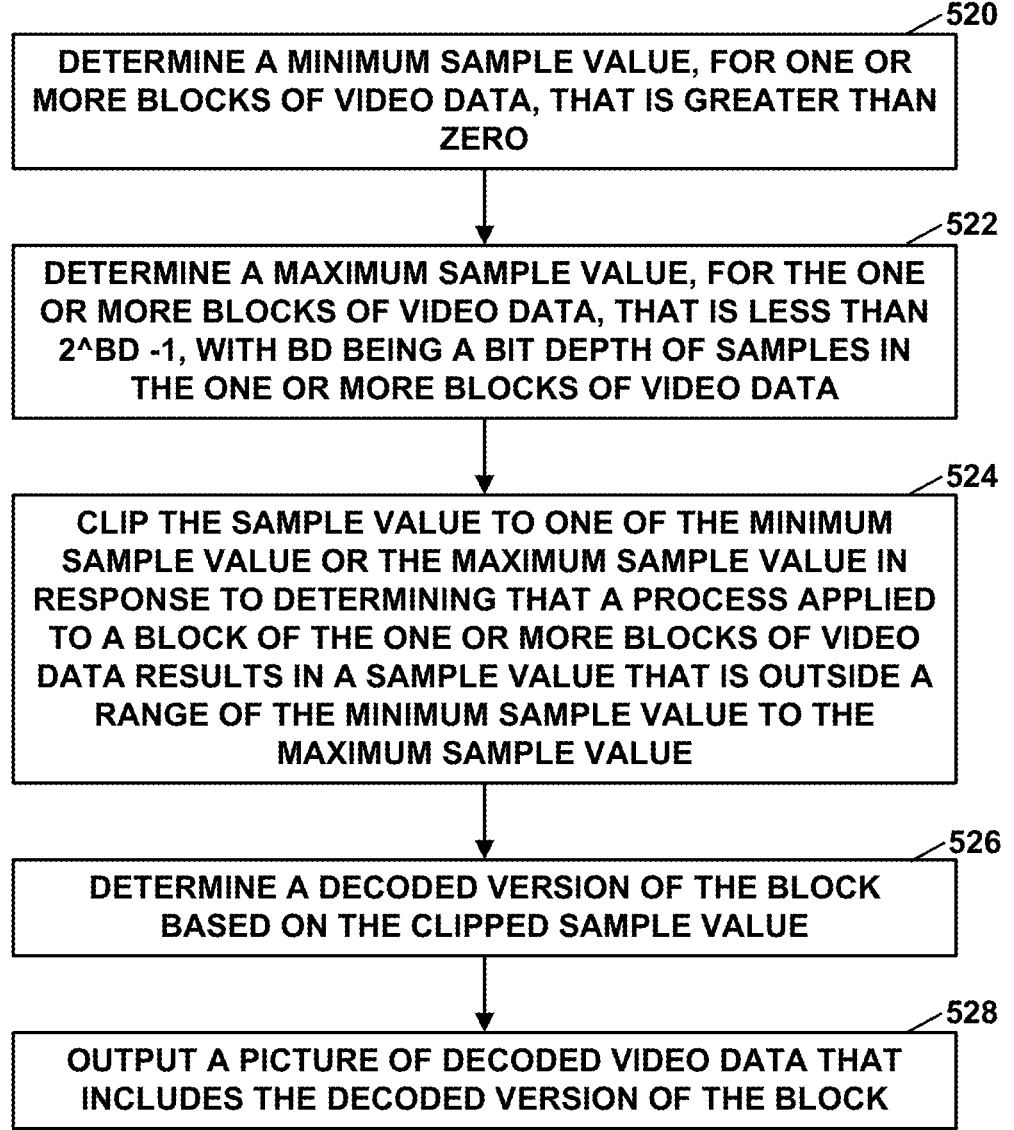

DETERMINE A MINIMUM SAMPLE VALUE, FOR ONE OR MORE BLOCKS OF VIDEO DATA, THAT IS GREATER THAN ZERO
520

DETERMINE A MAXIMUM SAMPLE VALUE, FOR THE ONE OR MORE BLOCKS OF VIDEO DATA, THAT IS LESS THAN 2^BD -1, WITH BD BEING A BIT DEPTH OF SAMPLES IN THE ONE OR MORE BLOCKS OF VIDEO DATA
522

CLIP THE SAMPLE VALUE TO ONE OF THE MINIMUM SAMPLE VALUE OR THE MAXIMUM SAMPLE VALUE IN RESPONSE TO DETERMINING THAT A PROCESS APPLIED TO A BLOCK OF THE ONE OR MORE BLOCKS OF VIDEO DATA RESULTS IN A SAMPLE VALUE THAT IS OUTSIDE A RANGE OF THE MINIMUM SAMPLE VALUE TO THE MAXIMUM SAMPLE VALUE
524

DETERMINE A DECODED VERSION OF THE BLOCK BASED ON THE CLIPPED SAMPLE VALUE
526

OUTPUT A PICTURE OF DECODED VIDEO DATA THAT INCLUDES THE DECODED VERSION OF THE BLOCK
528

FIG. 7

ADAPTIVE CLIPPING WITH SIGNALED LOWER AND UPPER BOUNDS IN VIDEO CODING

This application claims the benefit of U.S. Provisional Patent Application No. 63/588,246, filed 5 Oct. 2023, and U.S. Provisional Patent Application No. 63/604,535, filed 30 Nov. 2023, the entire content of each of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

Sample values in video data, e.g., luma sample values and chroma sample values, have a dynamic range from a minimum of 0 to a maximum of $2^{bd}-1$, with bd representing a bit depth of video data. For example, luma and chroma samples in 8-bit video have values between 0 and 255. Various steps in the video coding process may sometimes cause sample values to be outside this range, i.e., less than 0 or greater than $2^{bd}-1$. For example, adding residual samples to prediction samples may result in reconstructed samples that are outside of the range. As another example, in some instances an ALF process may modify an in-range sample value to be out-of-range.

Existing video coders are configured to clip out-of-range samples by setting sample values below 0 to be equal to 0 and setting sample values above the maximum value to be equal to the maximum value. The original, i.e., unencoded, video data of some portions of the video data, such as groups of blocks, slices, pictures, or other portions, may not have any sample values that are equal to 0 or $2^{bd}-1$. Instead, the minimum sample value for that portion of video data may be greater than 0, and the maximum value may be less than $2^{bd}-1$. This disclosure describes techniques for configuring a video decoder to determine minimum sample values greater than 0 and maximum sample values less than $2^{bd}-1$ for some portions of video data, and then, in response to determining that a process applied to a block video data results in a sample value that is outside a range of the minimum sample value to the maximum sample value, clipping the sample value to one of the minimum sample value or the maximum sample value. By clipping the sample value to one of the determined minimum sample value or the determined maximum sample value rather than 0 or $2^{bd}-1$, decoded video data may more accurately match the original video data, thus reducing the distortion introduced by the encoding process.

According to an example of this disclosure, a method of decoding video data includes determining a minimum sample value for one or more blocks of video data, wherein the minimum sample value is greater than 0; in response to determining that a process applied to a block of the one or more blocks of video data results in a sample value that is less than zero, clipping the sample value to the minimum sample value to generate a clipped sample value; determining a decoded version of the block based on the clipped sample value; and outputting a picture of decoded video data that includes the decoded version of the block.

According to an example of this disclosure, a method of decoding video data includes determining a maximum sample value for the one or more blocks of video data, wherein the maximum sample value is less than $2^{bd}-1$, wherein bd is a bit depth of samples in the one or more blocks of video data; in response to determining that a process applied to a block of the one or more blocks of video data results in a sample value that is greater than the maximum sample value, clipping the sample value to the maximum sample value to generate a clipped sample value; determining a decoded version of the block based on the clipped sample value; and outputting a picture of decoded video data that includes the decoded version of the block.

According to an example of this disclosure, a method of decoding video data includes determining a minimum sample value for one or more blocks of video data, wherein the minimum sample value is greater than 0; determining a maximum sample value for the one or more blocks of video data, wherein the maximum sample value is less than $2^{bd}-1$, wherein bd is a bit depth of samples in the one or more blocks of video data; in response to determining that a process applied to a block of the one or more blocks of video data results in a sample value that is outside a range of the minimum sample value to the maximum sample value, clipping the sample value to one of the minimum sample value or the maximum sample value to generate a clipped sample value; determining a decoded version of the block based on the clipped sample value; and outputting a picture of decoded video data that includes the decoded version of the block.

According to an example of this disclosure, a device for decoding video data includes a memory configured to store video data and one or more processors implemented in circuitry and configured to determine a minimum sample value for one or more blocks of video data, wherein the minimum sample value is greater than 0; determine a maximum sample value for the one or more blocks of video data, wherein the maximum sample value is less than $2^{bd}-1$, wherein bd is a bit depth of samples in the one or more blocks of video data; in response to determining that a process applied to a block of the one or more blocks of video data results in a sample value that is outside a range of the minimum sample value to the maximum sample value, clip the sample value to one of the minimum sample value or the maximum sample value to generate a clipped sample value; determine a decoded version of the block based on the clipped sample value; and output a picture of decoded video data that includes the decoded version of the block.

According to an example of this disclosure, a method encoding video data includes determining a minimum sample value for one or more blocks of unencoded video data, wherein the minimum sample value is greater than 0; determining a maximum sample value for the one or more blocks of the unencoded video data, wherein the maximum sample value is less than $2^{bd}-1$, wherein bd is a bit depth of samples in the one or more blocks of video data; encoding the unencoded video data to determine encoded video data; while decoding the encoded video data, determining that a process applied to a block of video data results in a sample value that is outside a range of the minimum sample value to the maximum sample value; in response to determining that the process applied to the block results in the sample value that is outside the range of the minimum sample value to the maximum sample value, clipping the sample value to one of the minimum sample value or the maximum sample value to generate a clipped sample value; determining a decoded version of the block based on the clipped sample value; and storing, in a decoded picture buffer, a picture of decoded video data that includes the decoded version of the block.

According to an example of this disclosure, a device for encoding video data includes a memory configured to store video data and one or more processors implemented in circuitry and configured to determine a minimum sample value for one or more blocks of unencoded video data, wherein the minimum sample value is greater than 0; determine a maximum sample value for the one or more blocks of the unencoded video data, wherein the maximum sample value is less than $2^{bd}-1$, wherein bd is a bit depth of samples in the one or more blocks of video data; encode the unencoded video data to determine encoded video data; while decoding the encoded video data, determine that a process applied to a block of video data results in a sample value that is outside a range of the minimum sample value to the maximum sample value; in response to determining that the process applied to the block results in the sample value that is outside the range of the minimum sample value to the maximum sample value, clip the sample value to one of the minimum sample value or the maximum sample value to generate a clipped sample value; determine a decoded version of the block based on the clipped sample value; and store, in a decoded picture buffer, a picture of decoded video data that includes the decoded version of the block.

The details of one or more examples are set forth in the accompanying drawings and the description below. Other features, objects, and advantages will be apparent from the description, drawings, and claims.

BRIEF DESCRIPTION OF DRAWINGS

FIG. 6 is a flowchart illustrating an example process for decoding a current block in accordance with the techniques of this disclosure.

FIG. 7 is a flowchart illustrating an example process for decoding a current block in accordance with the techniques of this disclosure.

DETAILED DESCRIPTION

Figure 1:
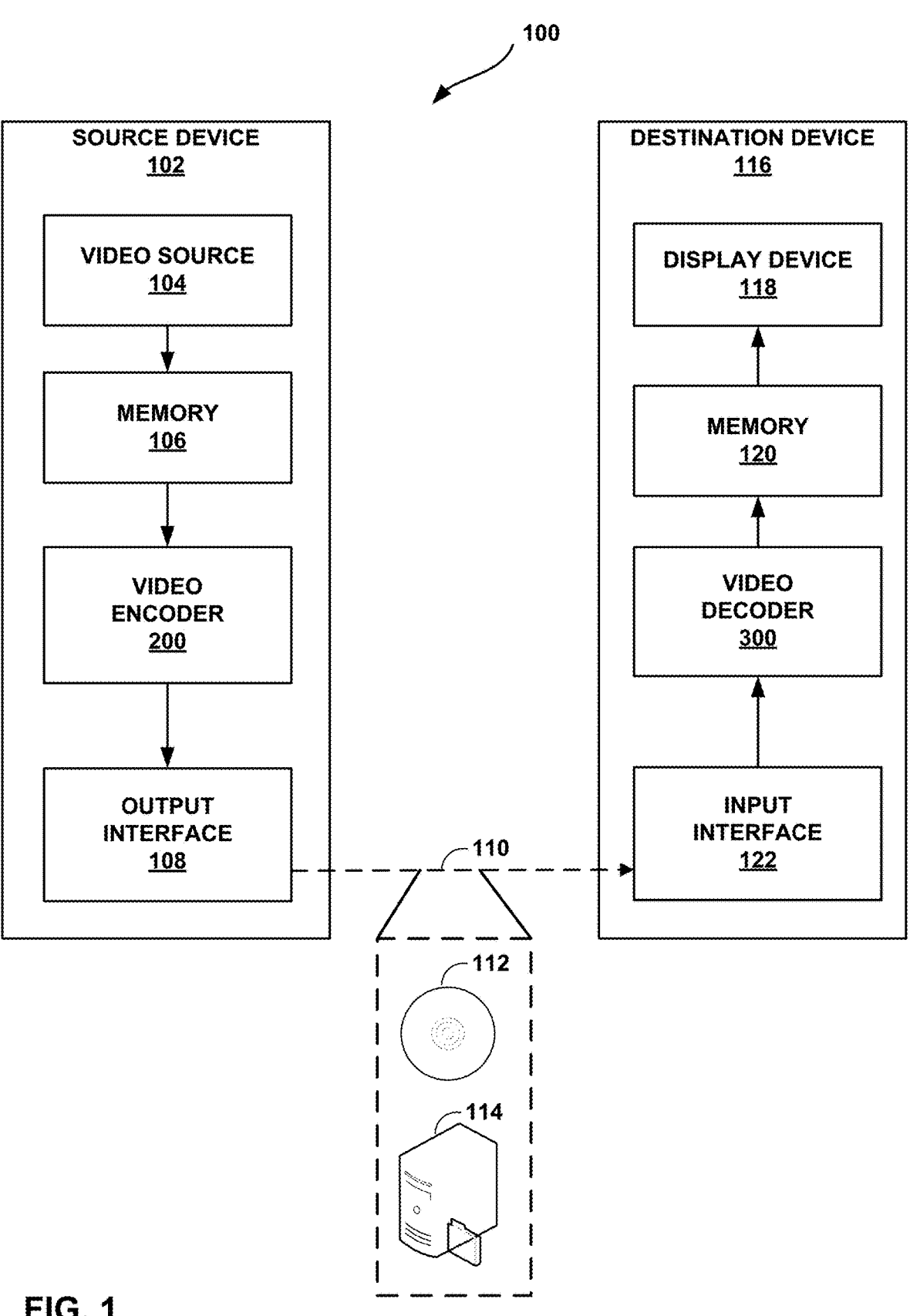
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

Sample values in video data, e.g., luma sample values and chroma sample values, have a dynamic range from a minimum of 0 to a maximum of $2^{bd}-1$, with bd representing a bit depth of video data. For example, luma and chroma samples in 8-bit video have values between 0 and 255. Various steps in the video coding process may sometimes cause sample values to be outside this range, i.e., less than 0 or greater than $2^{bd}-1$. For example, adding residual samples to prediction samples may result in reconstructed samples that are outside of the range. As another example, in some instances an ALF process may modify an in-range sample value to be out-of-range.

Existing video coders are configured to clip out-of-range samples by setting sample values below 0 to be equal to 0 and setting sample values above the maximum value to be equal to the maximum value. The original, i.e., unencoded, video data of some portions of the video data, such as groups of blocks, slices, pictures, or other portions, may not have any sample values that are equal to 0 or $2^{bd}-1$. Instead, the minimum sample value for that portion of video data may be greater than 0, and the maximum value may be less than $2^{bd}-1$. This disclosure describes techniques for configuring a video decoder to determine minimum sample values greater than 0 and maximum sample values less than $2^{bd}-1$ for some portions of video data, and then, in response to determining that a process applied to a block video data results in a sample value that is outside a range of the minimum sample value to the maximum sample value, clipping the sample value to one of the minimum sample value or the maximum sample value. By clipping the sample value to one of the determined minimum sample value or the determined maximum sample value rather than 0 or $2^{bd}-1$, decoded video data may more accurately match the original video data, thus reducing the distortion introduced by the encoding process.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process or a reciprocal process. Also, a video encoder typically performs video decoding (also called reconstruction) as part of the processes of determining how to encode video data. For example, a video encoder may perform the same clipping procedures as a video decoder on decoded video blocks in order to determine whether a certain encoding scheme produces a desirable rate-distortion tradeoff and also so that the video encoder can perform motion estimation using the same blocks available to a video decoder when the video decoder performs motion compensation.

This disclosure relates to data clipping and dynamic range clipping in video coding. The techniques of this disclosure may be applied to any of the existing video codecs, such as HEVC (High Efficiency Video Coding), VVC (Versatile Video Coding), Essential Video Coding (EVC) or be an efficient coding tool in future video coding standards. Video Coding Standards.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110.

Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for adaptive clipping. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the adaptive clipping techniques described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use clipping of sample values.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, NxN/2, N/4xN, and NxN/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an NxN block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an MxN block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "NxN" and "N by N" interchangeably to refer to the sample dimensions of a block (such as a CU or other video block) in terms of vertical and horizontal dimensions, e.g., 16x16 samples or 16 by 16 samples. In general, a 16x16 CU will have 16 samples in a vertical direction (y=16) and 16 samples in a horizontal direction (x=16). Likewise, an NxN CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include NxM samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2:
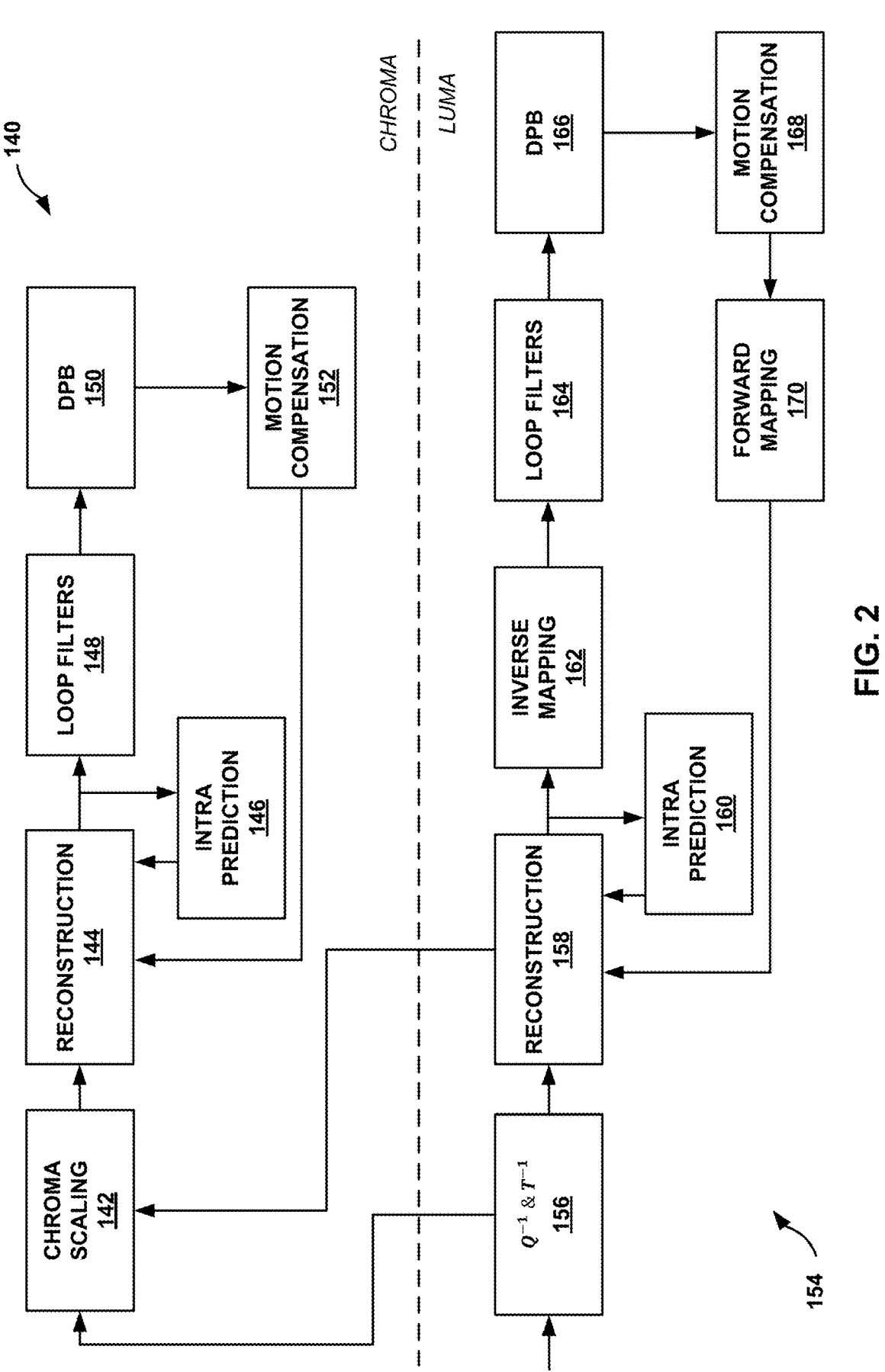
FIG. 2 shows an example of a luma mapping with chroma scaling decoding architecture.

Video encoder 200 and video decoder 300 may be configured to perform luma mapping with chroma scaling as in VVC. VVC has a tool named luma mapping with chroma scaling (LMCS). LMCS is designed to make better use of the range of luma code values allowed at a specified bit depth. As shown in FIG. 2, LMCS has two main components: 1) a process for mapping input luma code values to a new set of code values for use inside the coding loop; and 2) a luma-dependent process for scaling chroma residue values. The first process, luma mapping, aims at improving the coding efficiency for standard and high dynamic range video signals by making better use of the range of luma code values allowed at a specified bit depth. The second process, chroma scaling, manages relative compression efficiency for the luma and chroma components of the video signal. The luma mapping process of LMCS is applied at the pixel sample level, and is implemented using a piecewise linear model. The chroma scaling process is applied at the chroma block level and is implemented using a scaling factor derived from reconstructed neighboring luma samples of the chroma block.

The decoding architecture of LMCS is illustrated in FIG. 2. Upper part 140 of FIG. 2 illustrates the chroma residue scaling component of LMCS. Lower part 154 of FIG. 2 illustrates the luma mapping component of LMCS. LMCS introduces the concepts of signals being in either the "mapped domain" or the "original (non-mapped signal) domain". The luma code values of video signal in mapped domain which is processed by LMCS may be different from those of original video signals which is in original domain. Functional blocks 156-160 of FIG. 2 are performed on signals in the mapped domain when LMCS is enabled. These blocks include inverse quantization (Q−1) and inverse transform (T−1) 156, luma intra prediction 160, and summing the luma prediction with the luma residue values (Reconstruction 158). The unshaded blocks in FIG. 2 indicate that processing is applied in the original (non-mapped) domain. These blocks include loop filters 148, 164 (e.g., deblocking, adaptive loop filter (ALF), and sample adaptive offset (SAO)), motion compensated prediction (Motion Compensation 168), chroma intra prediction (Intra Prediction 146), summing chroma prediction with the chroma residue values (Reconstruction 158), and storage of pictures in a decoded picture buffer (DPB 150, 166).

Video encoder 200 and video decoder 300 may be configured to utilize a motion compensated temporal filter (Motion Compensation 152, 168). A motion compensated temporal bilateral denoising filter (MCTF) is used in VVC as a pre-filter to reduce the noise in the sequences. The filtering process (Loop Filters 148, 164) is applied before encoding and uses neighboring pictures. The filtering parameters of the current picture depend on the neighboring pictures, the position of the current picture in the Group of Pictures (GOP) and the value of quantization parameter (QP). The filter is designed for both random access and low-delay configurations. For low-delay configuration, the succeeding pictures are now available and not used. For all-intra configuration, MCTF is disabled.

The MCTF filtered sequences are treated as input and fed to the encoder for encoding. The filtered sequences are used in the rate-distortion performance to select the best coding modes during the encoding process. Due to the filtering, the distribution and the dynamic range of the MCTF filtered pictures are slightly different from the raw data from the yuv files.

In the current draft of ECM for encoders and decoders, M. Coban, F. Le Léannec and J. Strom, "Algorithm description of Enhanced Compression Model 2 (ECM 2)" JVET-W2025, July 2021, the bit-depth based clipping is adopted in various places to avoid the data overflow. The bit-depth dynamic range of a picture is defined as [0, 2^bitdepth−1] $[0, 2^{bitdepth-1}]$. When the sample value is smaller than 0, the sample value may be clipped to 0. When the value of a sample is larger than 2^bitdepth−1, the sample value may be clipped to 2^bitdepth−1. This clipping step is mandatory in filtering, weighted prediction, weighted combination, reconstruction, and other stages, to ensure that the generated prediction and reconstruction samples remain in the defined dynamic range. However, the bit-depth based dynamic range clipping ignores the characteristics and statistics of the pictures and sequences, which is inefficient and imprecise.

This disclosure describes techniques for using an adaptive clipping range and associated signaling, including the domain mapping for the clipping range when applicable. The disclosed techniques may be used solely or in any combination.

This disclosure defines adaptive clipping with signaled lower and upper bounds, which provides a more precise clipping considering the content of the picture and improves coding efficiency.

Video encoder 200 and video decoder 300 may be configured to perform adaptive clipping with signaled lower and upper bounds. In some examples, video encoder 200 and video decoder 300 may be configured to apply an adaptive clipping with the signaled lower and upper bounds. For each encoded picture, the minimum and maximum values [Imin, Imax] of a color channel are obtained, in one example by scanning all the samples from the picture buffer. The set of lower and upper bounds [Imin, Imax] may be signaled, for example in the picture header. When performing the clipping process in the encoding and decoding pipeline, the original bit-depth based clipping range [0, 2^bitdepth−1] may be replaced with the signaled lower and upper bounds [Imin, Imax]. If the sample value is smaller than the lower bound Imin, then the sample value may be clipped to Imin. If the sample value is larger than the upper bound Imax, then the sample value may be clipped to Imax.

In some examples, only a lower or upper bound is signaled, and the other may be fixed to be 2^bitdepth−1 or 0, or not used.

Video encoder 200 and video decoder 300 may be configured to apply adaptive clipping. In some examples, video encoder 200 and video decoder 300 may be configured to apply adaptive clipping when an encoder or decoder operation derives a prediction sample, a reconstruction sample or the derived values are multiplied by a scaling factor (e.g. filtering, ALF, deblocking (DB), SAO, downsampling, upsampling, reference picture resampling (RPR) and scaling, cross-component prediction, weighted combination of different predictors, weighted prediction, prediction multiplied by a scaling factor, weighted blending at edges, in reconstruction step when adding the residual signal to prediction).

In another example, video encoder 200 and video decoder 300 may be configured to apply adaptive clipping to a subset of places/modes that require clipping. For other places that require clipping, the bit-depth based clipping is applied. For example, the adaptive clipping may be applied to all or a subset of during a reconstruction step (e.g., when adding the residual signal to the prediction), during deblock filtering, during bilateral filtering, during an ALF process, after an ALF process (e.g., before storing in a decoded picture buffer). For other modes and places, bit-depth based clipping may be applied.

In some examples, video encoder 200 and video decoder 300 may be configured to apply adaptive clipping to one, some or all of the color channels. If adaptive clipping is not applied to all color channels, the bit-depth based clipping is applied to the rest of the color channels. For example, adaptive clipping is applied to luma component only.

In some examples, the adaptive clipping techniques described herein may be combined and applied differently based on the picture type or slice type. For example, for I-slices and B-slices, the clipping may be applied to the reconstruction step and after an ALF process. For a low delay B (LDB) an LDB-picture, the clipping may be only applied after ALF process. As a definition, an LDB picture is defined as a picture with all reference pictures that are from the past (or have a smaller POC number) compared to a current picture.

In some examples, the techniques described herein may be applied to the displayable region of a compressed picture (the same size as the input picture).

In some examples, the techniques described herein may be applied to the extended region of the picture. For example, when the boundary padding process is applied to the picture, the values of the samples in the padded region may be clipped using the techniques described herein.

Video encoder 200 and video decoder 300 may be configured to perform signaling related to adaptive clipping. In one example, the minimum and maximum values [Imin, Imax] of a color channel in a picture are signaled in one or more VPS, SPS, PPS, picture or slice headers. In one example, sign or unsigned binarization or codeword may be used, for example using unsigned variable length coding.

In another example, the minimum and maximum values [Imin, Imax] of a color channel in a picture may be quantized, for example by right shift operation of N bit, and then signaled. When decoding, the signaled values are dequantized, processed with left shift N bit operation in the above example, to reconstruct the corresponding lower and upper bounds.

In some examples, the quantization parameters may be predetermined integer values. In some examples, the quantization parameter value may be derived from a function of the bit depth, e.g., from a pre-determined table using bit depth as indices. In some examples, the quantization parameters may have a predetermined value for each color channel type. In some examples, a quantization parameter value N may be used for all pictures in a sequence.

In some examples, a quantization parameter value Nx may be used for a specific picture type. For example, quantization parameter value N0 may be used for an I-picture, quantization parameter value N1 used for a B-picture, quantization parameter value N2 used for a P-picture, and quantization parameter value N3 used for an LDB-picture. Also, given an example of LDB picture, how to define a LDB picture may be that all reference pictures are from past (or have a smaller POC number) compared to current picture.

In some examples, the quantization parameter values may be signaled in one or more parameter sets, such as a VPS, SPS, PPS, picture, or slice header with signed or unsigned binarization or codeword. For example, a signaled quantization parameter value in SPS may be used for all picture in a sequence (or segment of a sequence). For example, a signaled quantization parameter value in picture or slice header may be used for the picture.

In another example, the differences between the minimum/maximum values [Imin, Imax] and a predictor is signaled in one of the parameter sets and/or header as described earlier. In one example, the predictor may be set equal to the standard narrow dynamic ranges [Smin, Smax] (Smin=64, for luma Smax=940, for chroma Smax=960). In another example, predictor may be signaled. The difference between the range and the predictor may be signaled using signed binarization, for example signed variable length coding. Namely, Imin−Smin and Imax−Smax are signaled, in one example in the picture header with signed variable length coding. In some examples, the quantized delta value of Imin−Smin and Imax−Smax may be signaled in the picture header, with the quantization parameter being predetermined, signaled, or derived from a predetermined lookup table using bit depth or color channel types as indices.

In one example, for I-slice, the obtained minimum and maximum values [Imin, Imax] of a color channel are signaled as described earlier. For P-slice or B-slices, the value differences to the previous signaled values of I-slice are signaled with signed variable length coding.

In another example, the described above predictor may be signaled in one or multiple parameter sets, for example in SPS or VPS, and then the difference between the range value and its predictor is signaled per slice or picture, for example in a slice or picture header.

In another example, the min/max value predictor is signaled in SPS, and the difference between the range value and the predictor is signaled in slice header for P- or B-slice types and the difference is inferred equal to 0 without signaling for I-slices.

In some examples, the min/max value predictor is signaled in SPS and to avoid repeated signaling in slice header for multiple inter slices of a picture when there is no I-slices in that picture, the flag value of ph_intra_slice_allowed_flag, indicating whether I-slice may be present in a picture, is checked. The difference is signaled in a picture header if ph_intra_slice_allowed_flag is equal to 0 and may not be signaled in a slice header if ph_intra_slice_allowed_flag is equal to 0, and the difference is signaled in slice header if ph_intra_slice_allowed_flag is equal to 1 and slice type is equal to P- or B-slice type and may not be signaled in a picture header if ph_intra_slice_allowed_flag is equal to 1. For I-slices, the difference is inferred equal to 0 without signaling.

In another alternative or addition, picture type can be checked and based on that to determine whether difference is signaled, for example in slice or picture headers. In one example, the range predictor is signaled in SPS and if picture type is IRAP, which typically has SPS signaled, may not infer the difference equal to 0 without signaling and for non-IRAP picture the difference between the clipping range and the range predictor (signaled in SPS) is signaled, in one example the difference between the min value and min value predictor and the difference between max value and max value predictor.

Another example of signaling minimum/maximum values is to use the co-locate picture minimum/maximum values as the predictor values and only the differences to the predictor values are signaled in a slice or picture header. This signaling may, for example, be applied to inter slices such B- or P-slice. In some examples, the quantized difference values may be signaled in a slice or picture header, where the quantization process is one or any combination of the quantization processes described herein.

In some examples, one flag is signaled in one or multiple parameter sets to indicate if the [min, max] pair is signaled for the corresponding picture or slice. If the flag indicates [min, max] is not signaled, the default min and max are used, for example, the min and max values determined by the bit depth.

In some examples, the absolute value of the difference between the range value and the predictor is constrained to be less than a threshold. Examples of threshold values are 16, 32, 64, 128 et al. Then fixed length coding may be applied to code the difference.

In some examples, a set of [min, max] pairs are signaled in adaptive parameter set (APS), and an index is signaled at picture header, picture parameter set, slice header or block level to indicate the APS and the pair of [min, max] within the set that is used for the picture, slice or block (CTU for example). Each pair of [min, max] in the set can be predicted by the standard narrow dynamic ranges or a predictor as described in the above, and the differences are signaled.

Video encoder 200 and video decoder 300 may be configured to perform adaptive clipping when preprocessing is enabled. When preprocessing, in one example MCTF, is enabled, both luma and chroma channels of a picture may be pre-filtered before encoding. This may lead to different dynamic ranges of these pictures compared to the original unfiltered pictures. Video encoder 200 and video decoder 300 may be configured to obtain the minimum and maximum values [Imin_mctf, Imax_mctf] of a color channel by scanning all the pixel samples from the MCTF picture buffer of that channel when MCTF is enabled. The set of range [Imin_mctf, Imax_mctf] may be signaled, for example using any signaling technique described herein.

In one example, this preprocessing range (min and max values) may be signaled instead of the original range. In another example, the preprocessing range may be additionally signaled using any signaling technique described herein.

In some examples, when both preprocessing and original ranges are signaled, these two ranges may be used at certain places and operations in the encoder and decoder for clipping. The reconstructed pictures are clipped with the original range when used for display or quality evaluation. The reconstructed pictures are clipped with the preprocessing range and then used as reference pictures for encoding and decoding other pictures.

Video encoder 200 and video decoder 300 may be configured to perform adaptive clipping when domain mapping is applied. When domain mapping is applied to a picture, the sample values in one domain may be converted to a value in another domain and processed in the mapped domain. Some processing steps and modes may be operated in the mapped domain, others may be operated in the original domain. The original and the mapped domains may be converted with a look-up table (LUT) or a predefined mapping function. In some examples, it is proposed to map the lower and upper bounds to the corresponding domain, for example from the original to mapped domain, and then apply the clipping with the corresponding mapped lower and upper bounds. In one example, this mapping is performed for luma color component in LMCS. If scaling is enabled, for example as for chroma components in LMCS, the lower and upper bounds may be multiplied by the scaling factor. The scaled lower and upper bounds are used for clipping.

In one example, the detailed steps of applying this mapped and scaled clipping bounds in LMCS are as following. First, the lower and upper bounds of a color channel in a picture may be obtained from the picture buffer [Imin, Imax] (which is [Imin_mctf, Imax_mctf] from the MCTF picture buffer if MCTF is enabled). The lower and upper bounds may be signaled using any signaling technique described herein. When applying the clipping, for a luma channel, video decoder 300 first checks the following two conditions: 1) if LMCS is enabled, 2) is the current clipping position (modes) in the original domain or in the mapped domain. If LMCS is enabled and the current clipping is in the mapped domain, the lower and upper bounds [Imin, Imax] are mapped to the mapped domain as [I'min, I'max] with the LMCS forward mapping LUT. These mapped lower and upper bounds are then used for clipping the luma channel for this position (modes).

For chroma channels, video decoder 300 first checks the following two conditions 1) if LMCS is enabled, 2) if chroma scaling is enabled and what is the scaling factor. If LMCS is enabled and chroma scaling is enabled, the lower and upper bounds [Imin, Imax] of the chroma channels are multiplied by the scale factor [a*Imin, a*Imax] with the LMCS chroma scale factor a. These scaled lower and upper bounds are then used for clipping the chroma channels for this position (modes).

In some examples, when weighting/combining multiple prediction or reconstruction values from different domains, first, the clip range of the domain that each prediction/ reconstruction in may be used for clipping of that prediction/ reconstruction value. Then these predictions/reconstructions are mapped to the same domain and clipping with the range in that domain is applied on the weighted/combined prediction or reconstruction.

Figure 3:
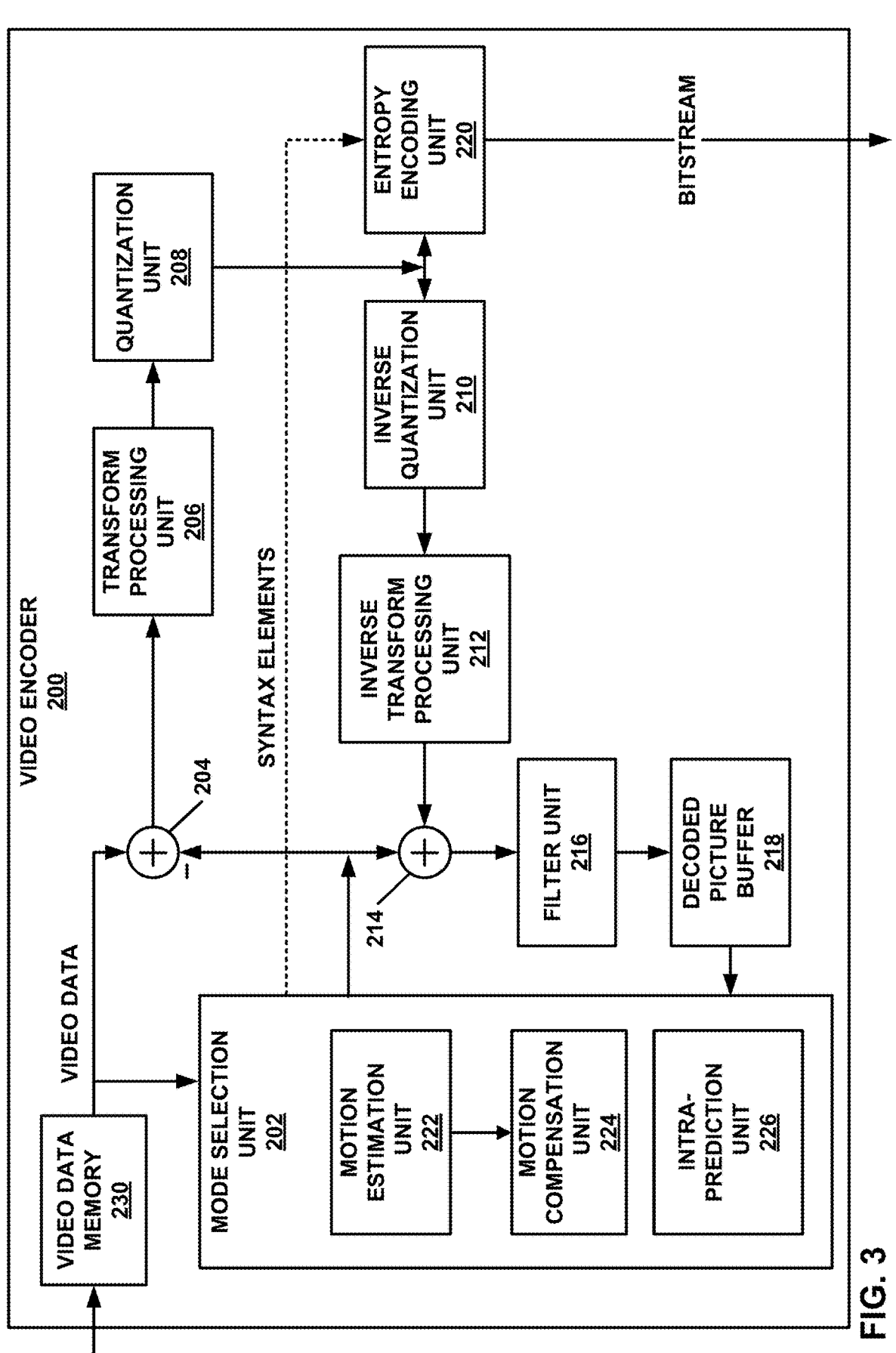
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is an example of a memory system that may act as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a minimum sample value greater than 0 for one or more blocks of video data and clip a sample value to the minimum sample value in response to determining that a process applied to a block of the one or more blocks of video data results in a sample value that is less than the minimum sample value. The one or more processing units implemented in circuitry may alternatively or additionally be configured to determine a maximum sample value less than $2^{bd}-1$ for one or more blocks of video data and clip a sample value to the maximum sample value in response to determining that a process applied to a block of the one or more blocks of video data results in a sample value that is greater than the maximum sample value.

Figure 4:
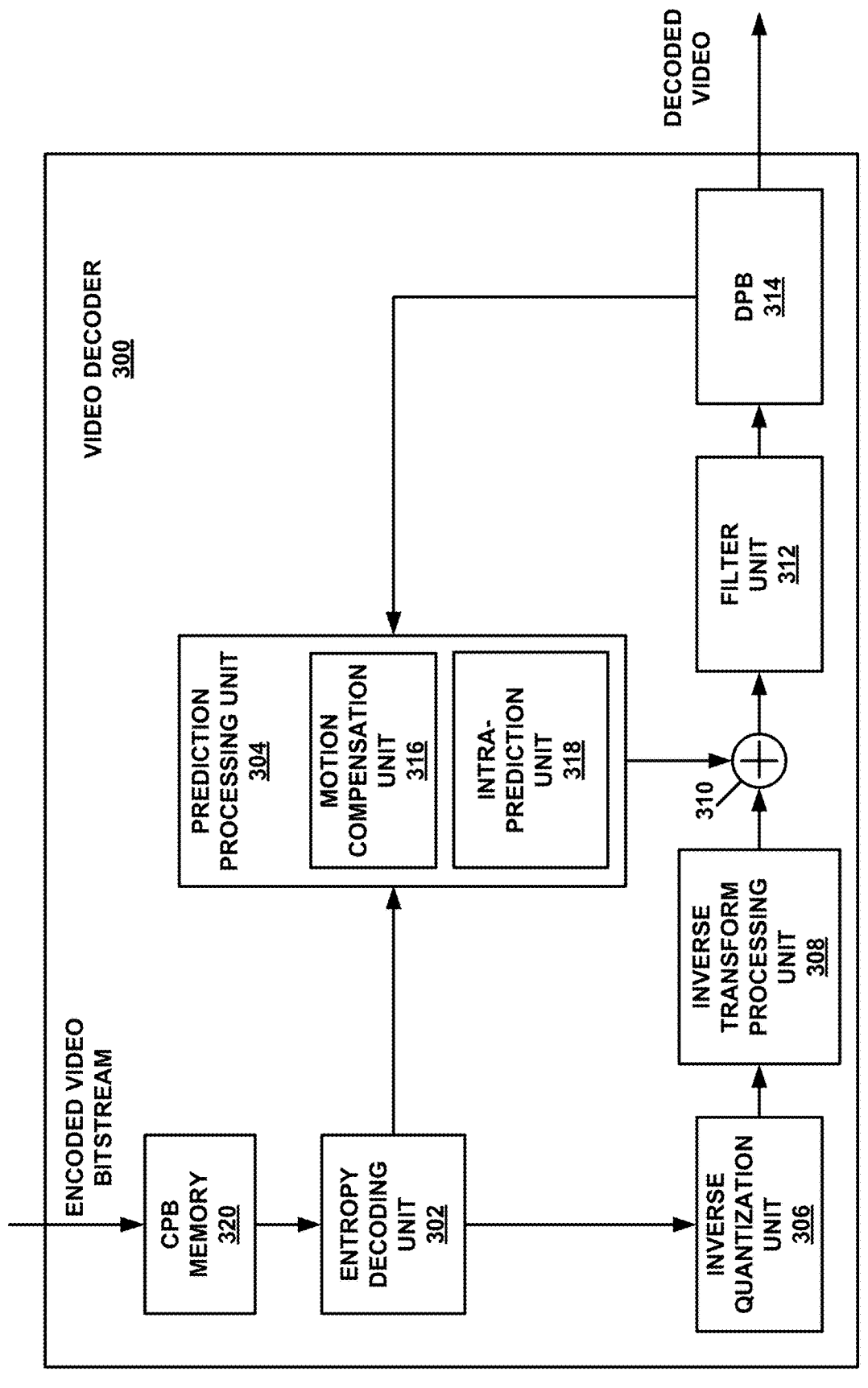
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine a minimum sample value greater than 0 for one or more blocks of video data and clip a sample value to the minimum sample value in response to determining that a process applied to a block of the one or more blocks of video data results in a sample value that is less than the minimum sample value. The one or more processing units implemented in circuitry may alternatively or additionally be configured to determine a maximum sample value less than $2\char`^bd-1$ for one or more blocks of video data and clip a sample value to the maximum sample value in response to determining that a process applied to a block of the one or more blocks of video data results in a sample value that is greater than the maximum sample value.

Figure 5:
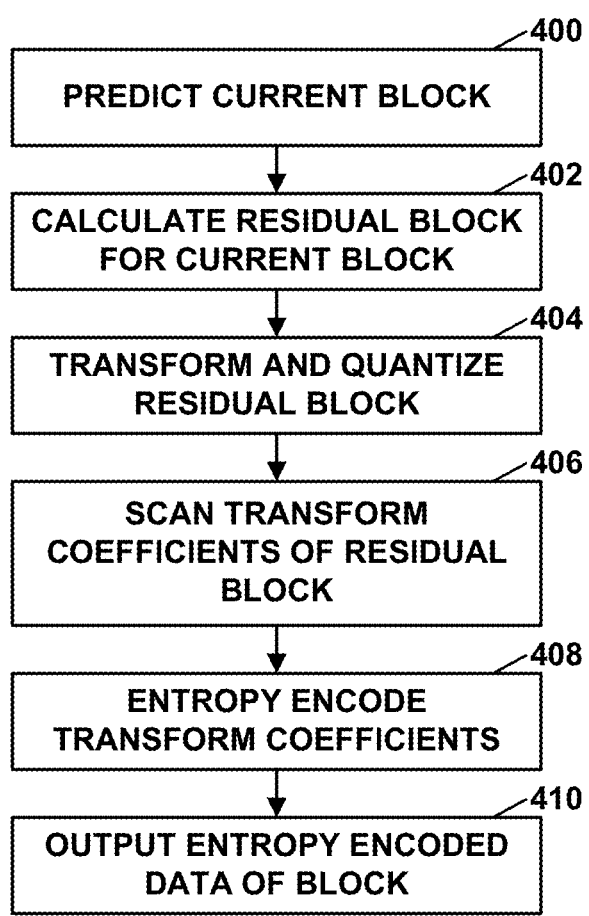
FIG. 5 is a flowchart illustrating an example process for encoding a current block in accordance with the techniques of this disclosure.

FIG. 5 is a flowchart illustrating an example process for encoding a current block in accordance with the techniques of this disclosure. The current block may be or include a current CU. Although described with respect to video encoder 200 (FIGS. 1 and 3), it should be understood that other devices may be configured to perform a process similar to that of FIG. 5.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

FIG. 6 is a flowchart illustrating an example process for decoding a current block of video data in accordance with the techniques of this disclosure. The current block may be or include a current CU. Although described with respect to video decoder 300 (FIGS. 1 and 4), it should be understood that other devices may be configured to perform a process similar to that of FIG. 6.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

FIG. 7 is a flowchart illustrating an example process for decoding a current block of video data in accordance with the techniques of this disclosure. The current block may be or include a current CU. Although described with respect to video decoder 300 (FIGS. 1 and 7), it should be understood that other devices may be configured to perform a process similar to that of FIG. 7. For example, the video decoding loop of video encoder 200 may also perform the techniques of FIG. 7.

In the example of FIG. 7, video decoder 300 determines a minimum sample value, for one or more blocks of video data, that is greater than zero (520). To determine the minimum sample value, video decoder 300 may, for example, receive a first syntax element indicating the minimum sample value. The first syntax may include a quantized minimum sample value, and video decoder 300 may determine the minimum sample value based on the quantized minimum sample value by, for example, dequantizing the quantized minimum sample value.

Video decoder 300 determines a maximum sample value, for the one or more blocks of video data, that is less than $2\char`^bd-1$, with bd representing a bit depth of samples in the one or more blocks of video data (522). To determine the maximum sample value, video decoder 300 may, for example, receive a second syntax element indicating the maximum sample value. The second syntax may include a quantized maximum sample value, and video decoder 300 may determine the maximum sample value based on the quantized maximum sample value by, for example, dequantizing the quantized maximum sample value.

Video decoder 300 clips the sample value to one of the minimum sample value or the maximum sample value in response to determining that a process applied to a block of the one or more blocks of video data results in a sample value that is outside a range of the minimum sample value to the maximum sample value (524). The sample value may, for example, be a luma sample value or a chroma sample value. The process applied to the block may, for example, include adding prediction samples for the block to residual samples for the block to determine reconstructed samples for the block, and the sample value that is outside the range of the minimum sample value to the maximum sample value may be a value of one of the reconstructed samples. In other examples, the process applied to the block may be an ALF process to determine filtered samples, and the sample value that is outside the range of the minimum sample value to the maximum sample value may be a value of one of the filtered samples.

Video decoder 300 determines a decoded version of the block based on the clipped sample value (526). Video decoder 300 outputs a picture of decoded video data that includes the decoded version of the block (528). Video decoder 300 may, for example, output the decoded picture for display, transmission, or storage. When the process of FIG. 7 is being performed as part of a video encoding process, the decoded picture may be stored for use in encoding other pictures of video data.

The following numbered clauses illustrate one or more aspects of the devices and techniques described in this disclosure.

Clause 1A: A method of coding video data, the method comprising: determining a minimum sample value for one or more blocks of video data, wherein the minimum sample value is greater than 0; determining a maximum sample value for the one or more blocks of video data, wherein the maximum sample value is less than $2^{bd}-1$, wherein bd is a bit depth of samples in the one or more blocks of video data; and in response to determining that a process applied to a block of the one or more blocks of video data results in a sample value that is outside a range of the minimum sample value to the maximum sample value, clipping the sample value to one of the minimum sample value or the maximum sample value.

Clause 2A: The method of clause 1A, wherein the process comprises one of filtering, weighted prediction, weighted combination, blending, or reconstruction.

Clause 3A: The method of clause 1A or 2A, wherein determining the minimum sample value comprises receiving a first syntax element in a picture header indicating the minimum sample value.

Clause 4A: The method of any of clauses 1A-3A, wherein determining the maximum sample value comprises receiving a second syntax element in a picture header indicating the maximum sample value.

Clause 5A: The method of clause 1A or 2A, wherein determining the minimum sample value comprises determining the minimum sample value based on sample values of pictures in a picture buffer.

Clause 6A: The method of clause 1A or 2A, wherein determining the maximum sample value comprises determining the maximum sample value based on sample values of pictures in a picture buffer.

Clause 7A: The method of any of clauses 1A-6A, wherein determining the minimum sample value comprises determining a quantized minimum sample value and determining the minimum sample value based on the quantized minimum sample value.

Clause 8A: The method of any of clauses 1A-7A, wherein determining the maximum sample value comprises determining a quantized maximum sample value and determining the maximum sample value based on the quantized maximum sample value.

Clause 9A: The method of any of clauses 1A-8A, wherein the sample value comprises a luma sample value.

Clause 10A: The method of any of clauses 1A-8A, wherein the sample value comprises a chroma sample value.

Clause 11A: A method of coding video data, the method comprising: determining a minimum sample value for one or more blocks of video data, wherein the minimum sample value is greater than 0; and in response to determining that a process applied to a block of the one or more blocks of video data results in a sample value that is less than the minimum sample value, clipping the sample value to the minimum sample value.

Clause 12A: A method of coding video data, the method comprising: determining a maximum sample value for one or more blocks of video data, wherein the maximum sample value is less than $2^{bd}-1$, wherein bd is a bit depth of samples in the one or more blocks of video data; and in response to determining that a process applied to a block of the one or more blocks of video data results in a sample value that is greater than the maximum sample value, clipping the sample value to the maximum sample value.

Clause 13A: The method of clause 11A or 12A, further comprising any of clauses 2A-8A.

Clause 14A: The method of any of clauses 1A-13A, wherein coding comprises decoding.

Clause 15A: The method of any of clauses 1A, 2A, or 5A-13A, wherein coding comprises encoding.

Clause 16A: A device for coding video data, the device comprising one or more means for performing the method of any of clauses 1A-15A.

Clause 17A: The device of clause 16A, wherein the one or more means comprise one or more processors implemented in circuitry.

Clause 18A: The device of any of clauses 16A and 17A, further comprising a memory to store the video data.

Clause 19A: The device of any of clauses 14A-16A, further comprising a display configured to display decoded video data.

Clause 20A: The device of any of clauses 16A-19A, wherein the device comprises one or more of a camera, a computer, a mobile device, a broadcast receiver device, or a set-top box.

Clause 21A: The device of any of clauses 16A-20A, wherein the device comprises a video decoder.

Clause 22A: The device of any of clauses 16A-21A, wherein the device comprises a video encoder.

Clause 23A: A computer-readable storage medium having stored thereon instructions that, when executed, cause one or more processors to perform the method of any of clauses 1A-15A.

Clause 1B: A method of decoding video data, the method comprising: determining a minimum sample value for one or more blocks of video data, wherein the minimum sample value is greater than 0; determining a maximum sample value for the one or more blocks of video data, wherein the maximum sample value is less than $2^{bd}-1$, wherein bd is a bit depth of samples in the one or more blocks of video data; in response to determining that a process applied to a block of the one or more blocks of video data results in a sample value that is outside a range of the minimum sample value to the maximum sample value, clipping the sample value to one of the minimum sample value or the maximum sample value to generate a clipped sample value; determining a decoded version of the block based on the clipped sample value; and outputting a picture of decoded video data that includes the decoded version of the block.

Clause 2B: The method of clause 1B, wherein the process applied to the block comprises adding prediction samples for the block to residual samples for the block to determine reconstructed samples for the block, and wherein the sample value that is outside the range of the minimum sample value to the maximum sample value is a value of one of the reconstructed samples.

Clause 3B: The method of clause 1B, wherein the process applied to the block comprises an adaptive loop filtering process to determine filtered samples and the sample value that is outside the range of the minimum sample value to the maximum sample value is a value of one of the filtered samples.

Clause 4B: The method of clause 1B, wherein the process applied to the block comprises one of deblock filtering, sample adaptive offset, downsampling, upsampling, reference picture resampling (RPR) and scaling, cross-component prediction, weighted combination of different predictors, weighted prediction, prediction multiplied by a scaling factor, domain mapping, or weighted blending at edges.

Clause 5B: The method of any of clauses 1B-4B, wherein determining the minimum sample value comprises receiving a first syntax element in a picture header indicating the minimum sample value.

Clause 6B: The method of any of clauses 1B-5B, wherein determining the maximum sample value comprises receiving a second syntax element in a picture header indicating the maximum sample value.

Clause 7B: The method of any of clauses 1B-6B, wherein determining the maximum sample value comprises determining a quantized maximum sample value and determining the maximum sample value based on the quantized maximum sample value.

Clause 8B: The method of any of clauses 1B-7B, wherein the sample value comprises a luma sample value.

Clause 9B: The method of any of clauses 1B-8B, wherein the sample value comprises a chroma sample value.

Clause 10B: The method of any of clauses 1B-4B, 8B, or 9B, wherein the method of decoding video data is performed as part of a video encoding process.

Clause 11B: A device for decoding video data, the device comprising: a memory configured to store video data; one or more processors implemented in circuitry and configured to: determine a minimum sample value for one or more blocks of video data, wherein the minimum sample value is greater than 0; determine a maximum sample value for the one or more blocks of video data, wherein the maximum sample value is less than $2^{bd}-1$, wherein bd is a bit depth of samples in the one or more blocks of video data; in response to determining that a process applied to a block of the one or more blocks of video data results in a sample value that is outside a range of the minimum sample value to the maximum sample value, clip the sample value to one of the minimum sample value or the maximum sample value to generate a clipped sample value; determine a decoded version of the block based on the clipped sample value; and output a picture of decoded video data that includes the decoded version of the block.

Clause 12B: The device of clause 11B, wherein the process applied to the block comprises adding prediction samples for the block to residual samples for the block to determine reconstructed samples for the block, and wherein the sample value that is outside the range of the minimum sample value to the maximum sample value is a value of one of the reconstructed samples.

Clause 13B: The device of clause 11B, wherein the process applied to the block comprises an adaptive loop filtering process to determine filtered samples and the sample value that is outside the range of the minimum sample value to the maximum sample value is a value of one of the filtered samples.

Clause 14B: The device of clause 11B, wherein the process applied to the block comprises one of deblock filtering, sample adaptive offset, downsampling, upsampling, reference picture resampling (RPR) and scaling, cross-component prediction, weighted combination of different predictors, weighted prediction, prediction multiplied by a scaling factor, domain mapping, or weighted blending at edges.

Clause 15B: The device of any of clauses 11B-14B, wherein to determine the minimum sample value, the one or more processors are further configured to receive a first syntax element in a picture header indicating the minimum sample value.

Clause 16B: The device of any of clauses 11B-15B, wherein to determine the maximum sample value, the one or more processors are further configured to receive a second syntax element in a picture header indicating the maximum sample value.

Clause 17B: The device of any of clauses 11B-16B, wherein to determine the maximum sample value, the one or more processors are further configured to determine a quantized maximum sample value and determining the maximum sample value based on the quantized maximum sample value.

Clause 18B: The device of any of clauses 11B-17B, wherein the sample value comprises a luma sample value.

Clause 19B: The device of any of clauses 11B-18B, wherein the sample value comprises a chroma sample value.

Clause 20B: The device of any of clauses 11B-20B, further comprising a display device configured to display the picture of decoded video data.

Clause 21B: The device of any of clauses 11B-20B, wherein the device comprises one or more of a camera, a computer, a mobile device, a broadcast receiver device, or a set-top box.

Clause 22B: A method encoding video data, the method comprising: determining a minimum sample value for one or more blocks of unencoded video data, wherein the minimum sample value is greater than 0; determining a maximum sample value for the one or more blocks of the unencoded video data, wherein the maximum sample value is less than $2^{bd}-1$, wherein bd is a bit depth of samples in the one or more blocks of video data; encoding the unencoded video data to determine encoded video data; while decoding the encoded video data, determining that a process applied to a block of video data results in a sample value that is outside a range of the minimum sample value to the maximum sample value; in response to determining that the process applied to the block results in the sample value that is outside the range of the minimum sample value to the maximum sample value, clipping the sample value to one of the minimum sample value or the maximum sample value to generate a clipped sample value; determining a decoded version of the block based on the clipped sample value; and storing, in a decoded picture buffer, a picture of decoded video data that includes the decoded version of the block.

Clause 23B: The method of clause 22B, wherein the process applied to the block comprises adding prediction samples for the block to residual samples for the block to determine reconstructed samples for the block, and wherein the sample value that is outside the range of the minimum sample value to the maximum sample value is a value of one of the reconstructed samples.

Clause 24B: The method of clause 22B, wherein the process applied to the block comprises an adaptive loop filtering process to determine filtered samples and the sample value that is outside the range of the minimum sample value to the maximum sample value is a value of one of the filtered samples.

Clause 25B: The method of clause 22B, wherein the process applied to the block comprises one of deblock filtering, sample adaptive offset, downsampling, upsampling, reference picture resampling (RPR) and scaling, cross-component prediction, weighted combination of different predictors, weighted prediction, prediction multiplied by a scaling factor, domain mapping, or weighted blending at edges.

Clause 26B: The method of any of clauses 22B-25B, further comprising transmitting encoded video data that includes a first syntax element indicating the minimum sample value and a second syntax element indicating the maximum sample value.

Clause 27B: A device for encoding video data, the device comprising: a memory configured to store video data; one or more processors implemented in circuitry and configured to: determine a minimum sample value for one or more blocks of unencoded video data, wherein the minimum sample value is greater than 0; determine a maximum sample value for the one or more blocks of the unencoded video data, wherein the maximum sample value is less than $2^{bd}-1$, wherein bd is a bit depth of samples in the one or more blocks of video data; encode the unencoded video data to determine encoded video data; while decoding the encoded video data, determine that a process applied to a block of video data results in a sample value that is outside a range of the minimum sample value to the maximum sample value; in response to determining that the process applied to the block results in the sample value that is outside the range of the minimum sample value to the maximum sample value, clip the sample value to one of the minimum sample value or the maximum sample value to generate a clipped sample value; determine a decoded version of the block based on the clipped sample value; and store, in a decoded picture buffer, a picture of decoded video data that includes the decoded version of the block.

Clause 28B: The device of clause 27B, wherein the process applied to the block comprises adding prediction samples for the block to residual samples for the block to determine reconstructed samples for the block, and wherein the sample value that is outside the range of the minimum sample value to the maximum sample value is a value of one of the reconstructed samples.

Clause 29B: The device of clause 27B, wherein the process applied to the block comprises an adaptive loop filtering process to determine filtered samples and the sample value that is outside the range of the minimum sample value to the maximum sample value is a value of one of the filtered samples.

Clause 30B: The device of any of clauses 27B-29B, wherein the one or more processors are further configured to transmit encoded video data that includes a first syntax element indicating the minimum sample value and a second syntax element indicating the maximum sample value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

determining a predictor value for a minimum sample value;

determining a predictor value for a maximum sample value;

receiving, in a picture header, a first syntax element set to a first value;

receiving, in the picture header, a second syntax element set to a second value;

dequantizing the first value to determine a difference between the minimum sample value and the predictor value for the minimum sample value;

dequantizing the second value to determine a difference between the maximum sample value and the predictor value for the maximum sample value;

determining the minimum sample value for one or more blocks of video data based on the predictor value for the minimum value and the difference between the minimum sample value and the predictor value for the minimum sample value, wherein the minimum sample value is greater than 0;

determining the maximum sample value for the one or more blocks of video data based on the predictor value for the maximum value and the difference between the maximum sample value and the predictor value for the maximum sample value, wherein the maximum sample value is less than $2^{bd}-1$, wherein bd is a bit depth of samples in the one or more blocks of video data;

in response to determining that a process applied to a block of the one or more blocks of video data results in a sample value that is outside a range of the minimum sample value to the maximum sample value, clipping the sample value to one of the minimum sample value or the maximum sample value to generate a clipped sample value;

determining a decoded version of the block based on the clipped sample value; and outputting a picture of decoded video data that includes the decoded version of the block.

2. The method of claim 1, wherein the process applied to the block comprises adding prediction samples for the block to residual samples for the block to determine reconstructed samples for the block, and wherein the sample value that is outside the range of the minimum sample value to the maximum sample value is a value of one of the reconstructed samples.

3. The method of claim 1, wherein the process applied to the block comprises an adaptive loop filtering process to determine filtered samples and the sample value that is outside the range of the minimum sample value to the maximum sample value is a value of one of the filtered samples.

4. The method of claim 1, wherein the process applied to the block comprises one of deblock filtering, sample adaptive offset, downsampling, upsampling, reference picture resampling (RPR) and scaling, cross-component prediction, weighted combination of different predictors, weighted prediction, prediction multiplied by a scaling factor, domain mapping, or weighted blending at edges.

5. The method of claim 1, wherein the sample value comprises a luma sample value.

6. The method of claim 1, wherein the sample value comprises a chroma sample value.

7. The method of claim 1, wherein the method of decoding video data is performed as part of a video encoding process.

8. A device for decoding video data, the device comprising:

a memory configured to store video data;

one or more processors implemented in circuitry and configured to:

determine a predictor value for a minimum sample value;

determine a predictor value for a maximum sample value;

receive, in a picture header, a first syntax element set to a first value;

receive, in the picture header, a second syntax element set to a second value;

dequantize the first value to determine a difference between the minimum sample value and the predictor value for the minimum sample value;

dequantize the second value to determine a difference between the maximum sample value and the predictor value for the maximum sample value;

determine the minimum sample value for one or more blocks of video data based on the predictor value for the minimum value and the difference between the minimum sample value and the predictor value for the minimum sample value, wherein the minimum sample value is greater than 0;

determine the maximum sample value for the one or more blocks of video data based on the predictor value for the maximum value and the difference between the maximum sample value and the predictor value for the maximum sample value, wherein the maximum sample value is less than $2^{bd}-1$, wherein bd is a bit depth of samples in the one or more blocks of video data;

in response to determining that a process applied to a block of the one or more blocks of video data results in a sample value that is outside a range of the minimum sample value to the maximum sample value, clip the sample value to one of the minimum sample value or the maximum sample value to generate a clipped sample value;

determine a decoded version of the block based on the clipped sample value; and output a picture of decoded video data that includes the decoded version of the block.

9. The device of claim 8, wherein the process applied to the block comprises adding prediction samples for the block to residual samples for the block to determine reconstructed samples for the block, and wherein the sample value that is outside the range of the minimum sample value to the maximum sample value is a value of one of the reconstructed samples.

10. The device of claim 8, wherein the process applied to the block comprises an adaptive loop filtering process to determine filtered samples and the sample value that is outside the range of the minimum sample value to the maximum sample value is a value of one of the filtered samples.

11. The device of claim 8, wherein the process applied to the block comprises one of deblock filtering, sample adaptive offset, downsampling, upsampling, reference picture resampling (RPR) and scaling, cross-component prediction, weighted combination of different predictors, weighted prediction, prediction multiplied by a scaling factor, domain mapping, or weighted blending at edges.

12. The device of claim 8, wherein the sample value comprises a luma sample value.

13. The device of claim 8, wherein the sample value comprises a chroma sample value.

14. The device of claim 8, further comprising a display device configured to display the picture of decoded video data.

15. The device of claim 8, wherein the device comprises one or more of a camera, a computer, a mobile device, a broadcast receiver device, or a set-top box.

16. A non-transitory computer-readable storage medium storing instructions that when executed by one or more processors cause the one or more processors to:

determine a predictor value for a minimum sample value;

determine a predictor value for a maximum sample value;

receive, in a picture header, a first syntax element set to a first value;

receive, in the picture header, a second syntax element set to a second value;

dequantize the first value to determine a difference between the minimum sample value and the predictor value for the minimum sample value;

dequantize the second value to determine a difference between the maximum sample value and the predictor value for the maximum sample value;

determine the minimum sample value for one or more blocks of video data based on the predictor value for the minimum value and the difference between the minimum sample value and the predictor value for the minimum sample value, wherein the minimum sample value is greater than 0;

determine the maximum sample value for the one or more blocks of video data based on the predictor value for the maximum value and the difference between the maximum sample value and the predictor value for the maximum sample value, wherein the maximum sample value is less than $2^{\wedge}bd-1$, wherein bd is a bit depth of samples in the one or more blocks of video data;

in response to determining that a process applied to a block of the one or more blocks of video data results in a sample value that is outside a range of the minimum sample value to the maximum sample value, clip the sample value to one of the minimum sample value or the maximum sample value to generate a clipped sample value;

determine a decoded version of the block based on the clipped sample value; and output a picture of decoded video data that includes the decoded version of the block.

17. The non-transitory computer-readable storage medium of claim 16, wherein the process applied to the block comprises adding prediction samples for the block to residual samples for the block to determine reconstructed samples for the block, and wherein the sample value that is outside the range of the minimum sample value to the maximum sample value is a value of one of the reconstructed samples.

18. The non-transitory computer-readable storage medium of claim 16, wherein the process applied to the block comprises an adaptive loop filtering process to determine filtered samples and the sample value that is outside the range of the minimum sample value to the maximum sample value is a value of one of the filtered samples.

19. The non-transitory computer-readable storage medium of claim 16, wherein the process applied to the block comprises one of deblock filtering, sample adaptive offset, downsampling, upsampling, reference picture resampling (RPR) and scaling, cross-component prediction, weighted combination of different predictors, weighted prediction, prediction multiplied by a scaling factor, domain mapping, or weighted blending at edges.

20. The non-transitory computer-readable storage medium of claim 16, wherein the sample value comprises a luma sample value.

21. The non-transitory computer-readable storage medium of claim 16, wherein the sample value comprises a chroma sample value.

22. A device for encoding video data, the device comprising: a memory configured to store video data; one or more processors implemented in circuitry and configured to: determine a minimum sample value for one or more blocks of video data, wherein the minimum sample value is greater than O; determine a maximum sample value for the one or more blocks of video data, wherein the maximum sample value is less than $2^{\wedge}bd-1$, wherein bd is a bit depth of samples in the one or more blocks of video data; determine a predictor value for the minimum sample value; determine a predictor value for the maximum sample value; determine a first value corresponding to a difference between the predictor value for the minimum sample value and the minimum sample value; determine a second value corresponding to a difference between the predictor value for the maximum sample value and the maximum sample value; quantize the first value to determine a quantized first value; quantize the second value to determine a quantized second value; transmit, in a picture header of a bitstream of encoded video data, a first syntax element set to the first quantized value; and transmit, in the picture header of the bitstream of encoded video data, a second syntax element set to the second quantized value.

23. The device of claim 22, wherein the sample value comprises a luma sample value.

24. The device of claim 22, wherein the sample value comprises a chroma sample value.

25. The device of claim 22, further comprising a camera device configured to capture the video data.

* * * * *